(12) United States Patent
Schmieder et al.

(10) Patent No.: US 8,439,591 B2
(45) Date of Patent: May 14, 2013

(54) TUBE ARRANGEMENT AND CROSSBEAM HAVING SUCH A TUBE ARRANGEMENT

(75) Inventors: Hansjoerg Schmieder, Oberkirch-Zusenhofen (DE); Romaric Jonckheere, Illkirch-Graffenstaden (FR); Arnaud Offner, Soufflenheim (FR)

(73) Assignee: Progress-Werk Oberkirch AG, Oberkirch (DE)

( * ) Notice: Subject to any disclaimer, the term of this patent is extended or adjusted under 35 U.S.C. 154(b) by 572 days.

(21) Appl. No.: 12/548,196

(22) Filed: Aug. 26, 2009

(65) Prior Publication Data

US 2010/0052366 A1 Mar. 4, 2010

(30) Foreign Application Priority Data

Aug. 28, 2008 (DE) .......................... 10 2008 045 914

(51) Int. Cl.
*F16B 7/00* (2006.01)
*B62D 25/08* (2006.01)
(52) U.S. Cl.
USPC .......................... 403/292; 296/193.02; 296/29
(58) Field of Classification Search ............. 296/193.06, 296/29, 70; 403/393, 389, 396, 400, 385, 403/102, 100, 177, 192, 292
See application file for complete search history.

(56) References Cited

U.S. PATENT DOCUMENTS

| | | | | |
|---|---|---|---|---|
| 3,760,649 A | * | 9/1973 | Decouzon et al. | 74/492 |
| 5,642,971 A | * | 7/1997 | Ragsdale | 410/106 |
| 6,391,470 B1 | * | 5/2002 | Schmieder et al. | 428/598 |

FOREIGN PATENT DOCUMENTS

| | | |
|---|---|---|
| DE | 199 08 833 A1 | 9/2000 |
| EP | 1 158 232 A2 | 11/2001 |

OTHER PUBLICATIONS

German Examination Report dated Nov. 10, 2009.

* cited by examiner

*Primary Examiner* — Glenn Dayoan
*Assistant Examiner* — Melissa A Black
(74) *Attorney, Agent, or Firm* — Marshall, Gerstein & Borin LLP

(57) ABSTRACT

A tube arrangement comprises a first tube and at least one second tube, the first tube and the second tube being arranged in relation to one another with an offset transversely with respect to the longitudinal direction of the tubes and with a partial overlap region in the longitudinal direction of the tubes, so that a first end of the first tube is arranged at a side of the second tube and a second end of the second tube is arranged at a side of the first tube. The tube arrangement has, further, at least one connection element which fixedly connects the first tube and the second tube to one another in the overlap region. The connection element has a first end wall and a second end wall spaced apart from the first end wall in the longitudinal direction of the tubes, which end walls extend, in the overlap region, between the tubes transversely with respect to the longitudinal direction of the latter and are fixedly connected to these, and two longitudinal walls which are spaced apart from one another transversely with respect to the longitudinal direction and which extend in the longitudinal direction of the tubes from the first end wall to the second end wall and are fixedly connected to these.

38 Claims, 7 Drawing Sheets

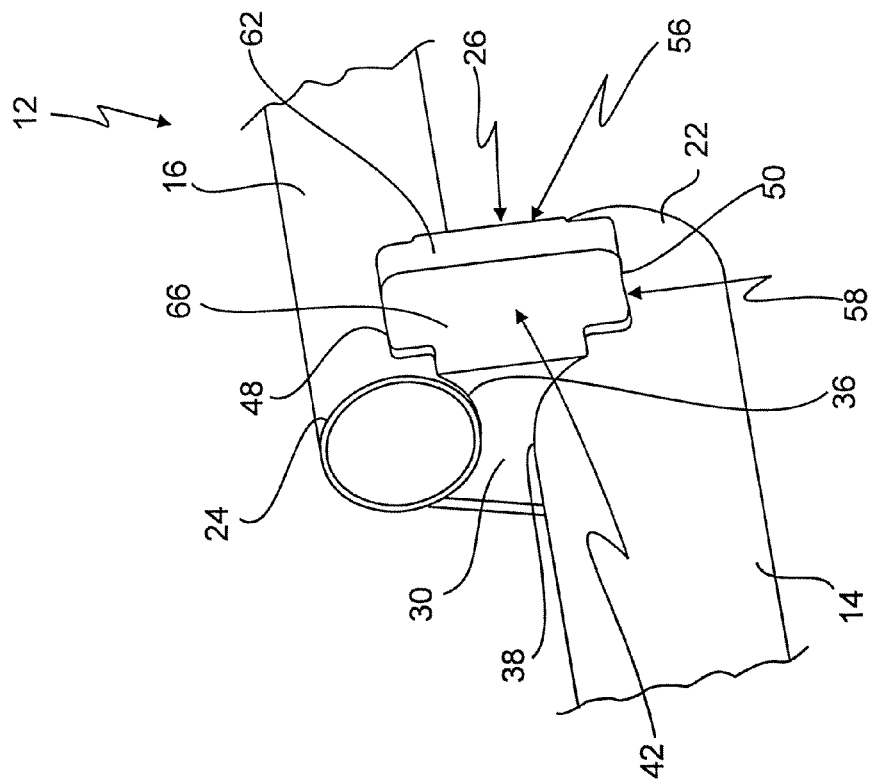
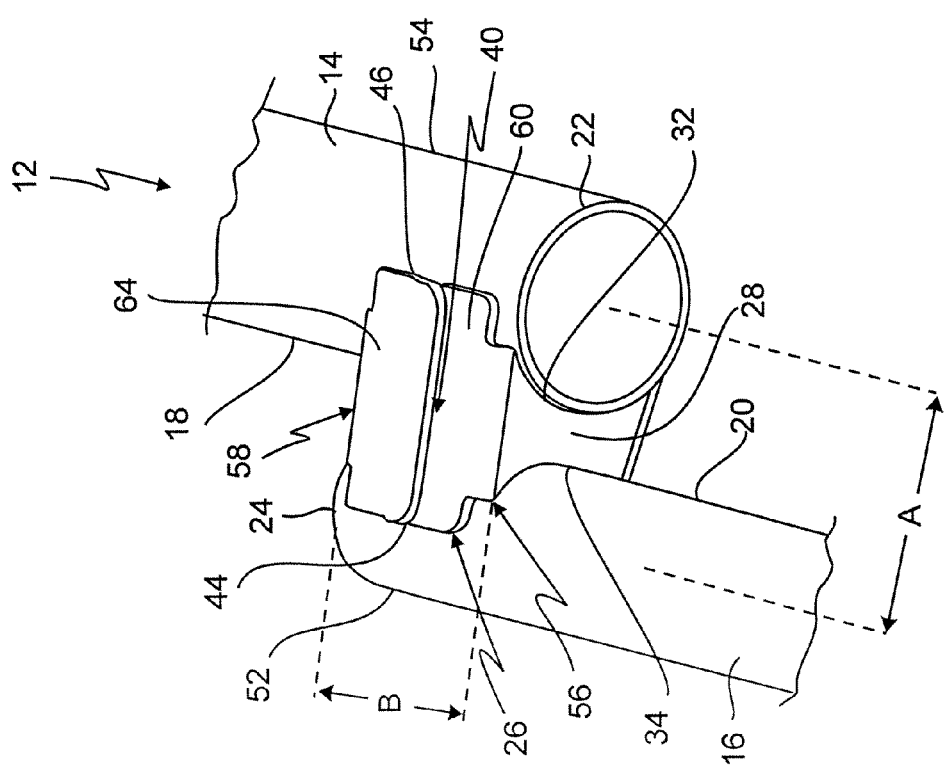

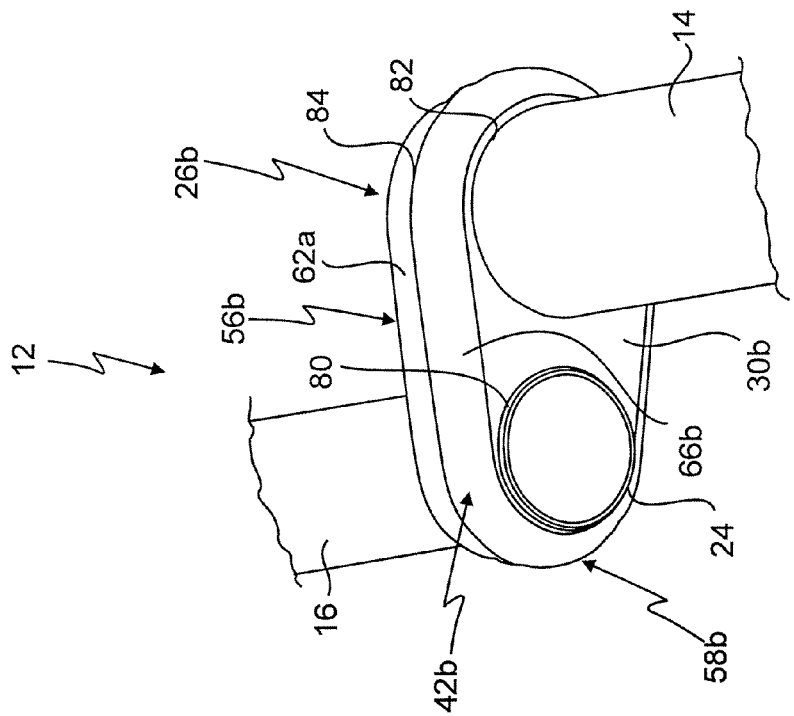
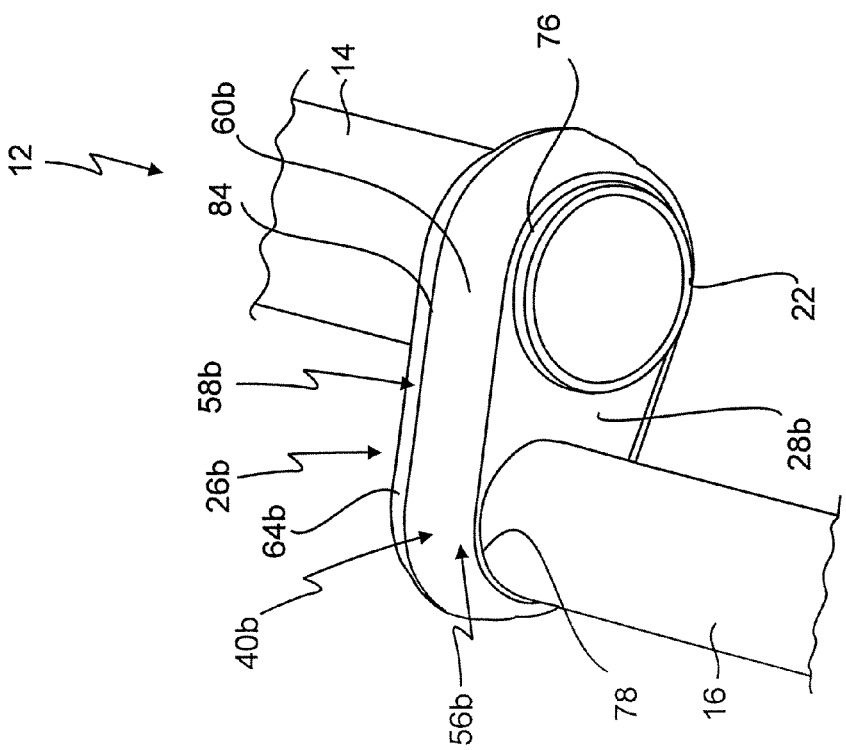

TUBE ARRANGEMENT AND CROSSBEAM HAVING SUCH A TUBE ARRANGEMENT

CROSS-REFERENCE TO FOREIGN APPLICATION

The present application claims priority of German Patent Application No. 10 2008 045 914.3 filed on Aug. 28, 2008.

BACKGROUND OF THE INVENTION

The invention generally relates to tube arrangements, in particular to tube arrangements which form crossbeams or which form part of crossbeams, in particular crossbeams used in motor vehicles.

Without any restriction in generality, the tube arrangement according to the invention is described by the example of its use as a crossbeam or as a component of a crossbeam for a motor vehicle. As part of the motor vehicle body, the crossbeam is arranged so as to run approximately horizontally between the A-pillars, as they are known, in the region below the windscreen. The crossbeam serves for fastening the instrument panel, moreover the crossbeam stiffening the instrument panel which usually consists of plastic and/or wooden parts.

The crossbeam must have a high degree of flexural strength not only because of its function of stiffening the instrument panel, but also on account of its function as a body component. High flexural strength of the crossbeam contributes, not least, to the higher safety of the motor vehicle and to protection of the occupants in the event of an accident.

While crossbeams may, in principle, be manufactured from a continuous tube, structural conditions dependent on the vehicle type may make it necessary to construct the crossbeams from a plurality of tubes which must be fixedly connected to one another. Constructing a crossbeam from a tube arrangement which has a plurality of tubes may also be advisable against the background of the avoidance of resonances in the crossbeam when the motor vehicle is being driven. For this purpose, it may be appropriate to produce the crossbeam from a plurality of tubes which have different cross-sectional sizes and/or cross-sectional shapes.

In the context of the present invention, the term "tube" is to be understood in general, and a tube in the context of the present invention may have any desired cross-sectional shape which, for example, may be round, angular or oval. Furthermore, it would be appreciated that, in the tube arrangement according to the invention, the first tube and the second tube may have identical or different cross-sectional shapes and/or cross-sectional sizes. Moreover, the first tube and/or the second tube may not only have a straight run, as seen in the longitudinal direction, but may also have one or more bends. Also, in the region of their connection, the tubes, instead of running parallel to one another, may also run obliquely with respect to one another.

If the crossbeam has a tube arrangement which is assembled from a plurality of tubes, there is basically a problem in the flexion-resistant connection of the individual tubes to one another.

The simplest connection technique for connecting two tubes is to arrange the two tubes side by side so as to partially overlap one another, so that the tubes are in contact in the overlap region, and to weld the two tubes to one another in the overlap region. If the two tubes have a round cross section, however, there is the problem that the two tubes are in contact in the overlap region solely along a generatrix, and the connection of the two tubes is correspondingly limited to a linear weld seam. Such a connection of the two tubes, however, does not have sufficient flexural strength. In order to achieve higher flexural strength with such a connection technique, the overlap region could be enlarged in the longitudinal direction, although, because of the greater length of the two tubes which is required, this may lead to an increased outlay in terms of material and therefore to a higher weight of the tube arrangement, this being undesirable when the tube arrangement is used for a crossbeam in a motor vehicle.

Another possibility for connecting the two tubes of the tube arrangement is to arrange in the overlap region of the two tubes a metal sheet which extends transversely with respect to the longitudinal direction of the two tubes and which is welded to the two tubes, and to arrange, from the respective end of one tube to the other tube, a gusset which extends in the longitudinal direction of the tubes. The gussets, although increasing the flexural strength of the connection of the two tubes, nevertheless have the disadvantage that, if the tube arrangement is used for a crossbeam, they impede the mounting of further structural parts of the crossbeam, in particular tie-up elements, for example for the instrument panel, in the region of the connection of the two tubes.

Furthermore, a connection by means of the connection elements described above has the further disadvantage that the flexural strength is sufficient in only two preferential directions which are determined by the planes of the connecting sheets or gussets, but may be insufficient in other spatial directions. Sufficient flexural strength in a multiplicity of spatial directions would make it necessary, in such a connection technique, to mount further gussets which extend in different directions, which, however, further increases the weight and costs of the tube arrangement.

To be precise, in addition to the requirement for a low weight of a crossbeam for a motor vehicle, it must also be capable of being produced cost-effectively, thus entailing a further restriction in the possibilities for making a flexion-resistant connection of the two tubes.

SUMMARY OF THE INVENTION

An object of the present invention is to develop a tube arrangement of the type mentioned in the introduction, to the effect that the tube arrangement is sufficiently flexion-resistant in the region of the connection in more than only two preferential directions, while the flexion-resistant connection of the first tube to the second tube should be capable of being made with as low a weight as possible and as cost-effectively as possible.

According to a first aspect of the invention, a tube arrangement is provided, comprising a first tube and at least one second tube, the first tube and the second tube being arranged in relation to one another with an offset transversely with respect to a longitudinal direction of the first and second tubes and with a partial overlap region in the longitudinal direction of the first and second tubes, so that a first end of the first tube is arranged at a side of the second tube and a second end of the second tube is arranged at a side of the first tube, at least one connection element fixedly connecting the first tube and the second tube to one another in the overlap region, the at least one connection element having a first end wall and a second end wall spaced apart from the first end wall in the longitudinal direction of the first and second tubes, which first and second end walls extend, in the overlap region, between the first and second tubes transversely with respect to the longitudinal direction of the first and second tubes and are fixedly connected to the first and second tubes, and a first longitudinal wall and a second longitudinal wall spaced apart from the first longitudinal wall transversely with respect to the longitudinal direction of the first and second tubes, and which extend in the longitudinal direction of the first and second tubes from the first end wall to the second end wall and are fixedly connected to the first and second end walls.

According to another aspect of the invention, a crossbeam for a motor vehicle is provided, comprising a tube arrangement according to the invention.

The tube arrangement according to the invention thus comprises a connection between the first tube and the second tube which is made by means of at least one, preferably only one, connection element which, by virtue of its two end walls and the two longitudinal walls, has essentially the form of a box-shaped polygonal profile. The essentially box-shaped profile of the connection element makes between the two tubes, in the overlap region, a connection which is highly flexion-resistant in virtually all spatial directions. The two end walls and the two longitudinal walls are fixedly connected to one another, either in one piece or by means of a corresponding materially integral connection, such as by means of weld seams or the like. Depending on the configuration of the connection element, it may be sufficient that only the end walls of the connection element are fixedly connected, for example welded, to the tubes, while the longitudinal walls further increase the flexural strength solely on account of their rigid connection to the end walls, without the said longitudinal walls having to be welded to the tubes. By means of a connection element which is of essentially box-shaped design, a highly flexion-resistant connection having substantially smaller spatial dimensions is achieved, specifically both in the direction transverse to the longitudinal direction of the tubes and in the longitudinal direction of the tubes, such as is not possible by means of individual plates and gussets. The connection element may also correspondingly having a low weight. Finally, the connection of the two tubes to one another by means of the connection element according to the invention is also simplified, particularly when the latter is already prefabricated in one piece. The connection of the two tubes to one another can therefore also be made cost-effectively.

In the context of the present invention, the extent of the first and the second end wall transversely with respect to the longitudinal direction of the tubes comprises an extent perpendicularly to the longitudinal direction of the tubes or an extent obliquely to the longitudinal direction of the tubes.

The tube arrangement according to the invention is suitable particularly for the production of a crossbeam on account of the advantages mentioned above.

In a preferred refinement of the tube arrangement, the first end wall bears against the end face of the first end of the first tube, and/or the second end wall bears against the end face of the second end of the second tube.

This refinement of the connection element and of the connection between the two tubes in their overlap region has the advantage that the connection element is mounted more easily at the two ends of the tube, because the first and the second end wall, by bearing respectively against the first and the second end of the two tubes, also essentially predetermine the relative position of these with respect to one another in the longitudinal direction of the tubes. The overlap region of the two tubes is therefore predetermined by the spacing between the first end wall and the second end wall, with the result that the adjustment of the two tubes with respect to one another is simplified.

The first end wall and/or the second end wall must not necessarily be closed over the full area, but, instead, one or more cutouts in the end walls may also be provided, in order to reduce the weight of the connection element.

In a refinement alternative to the abovementioned refinement, the first end wall has a fully circumferentially closed orifice, into which or through which the first end of the first tube engages, and/or the second end wall has a fully circumferentially closed orifice, into which or through which the second end of the second tube engages.

One advantage of this refinement is that the length of the overlap region of the two tubes is not unchangeably predetermined by the connection element, and therefore a compensation of length tolerance is possible before the fastening of the connection element, because the two tubes can still be displaced in relation to one another in their longitudinal direction before the fastening of the connection element.

In a further preferred refinement, the first end wall has a fully circumferentially closed orifice, through which the second tube engages, and/or the second end wall has a fully circumferentially closed orifice, through which the first tube engages.

In this refinement, the first end wall surrounds the second tube at a distance from the second end of the second tube, and/or the second end wall surrounds the first tube at a distance from the first end of the first tube. A particularly flexion-resistant connection between the two tubes is thereby achieved, since the two tubes are framed over the full circumference by the end walls.

In a further preferred refinement, the first end wall has, at its end facing the first tube, a margin which is preferably adapted to the circumferential contour of the first tube and which bears only partially circumferentially against the outer circumference of the first tube, and/or the second end wall has, at its end facing the second tube, a margin which is preferably adapted to the circumferential contour of the second tube and which bears only partially circumferentially against the outer circumference of the second tube.

In this refinement, the first end wall does not extend and/or the second end wall does not extend over the full transverse dimension of the first tube or of the second tube, but, instead, the first end wall or the second end wall is present only in the interspace between the two tubes. The advantage of this measure is that the connection element has a low weight, while there is still a sufficiently high flexural strength in the connection of the tubes.

In a further preferred refinement, the first end wall has, at its end facing the second tube, a margin which is preferably adapted to the circumferential contour of the second tube and which bears only partially circumferentially against the outer circumference of the second tube, and/or the second end wall has, at its end facing the first tube, a margin which is preferably adapted to the circumferential contour of the first tube and which bears only partially circumferentially against the outer circumference of the first tube.

While having the same advantage of weight saving as in the abovementioned refinement, this measure has the further advantage that those outer circumferential regions of the tubes which face away from one another and are spaced apart from the respective end of the first and the second tube remain free for mounting further structural elements on the tube arrangement, and the connection element does not interference with such structural elements.

In a further preferred refinement, the longitudinal walls surround, at least over a part-length of the spacing between the first and the second end wall, those outer circumferential regions of the two tubes which face away from one another.

This measure again contributes to increasing the flexural strength of the connection of the two tubes. For the weight saving and for the saving of material, the longitudinal walls may surround, only over a part-length of the overlap region, those outer circumferential regions of the two tubes which face away from one another. The longitudinal walls then form a kind of loop which engages around those outer circumferential regions of the two tubes which face away from one another. The present refinement may, in particular, also be combined with a refinement of the first end wall and/or of the second end wall whereby the first end wall and/or the second end wall bear/bears only partially circumferentially against the outer circumference of the first and/or the second tube.

With a view to a weight saving and to the possibility of mounting further structural elements on the tube arrangement in the overlap region of the two tubes, it is likewise preferable that the longitudinal walls extend in the direction transversely with respect to the longitudinal direction only as far as respective outer contour points which are located on the first and on the second tube and which are spaced apart from the outer contour regions of the first and the second tube which face away from one another.

In this refinement, therefore, those outer contour regions of the first and second tube which face away from one another remain free, in the overlap region, for mounting further structural elements on the two tubes, without the connection element interfering with these structural elements.

In a further preferred refinement, the connection element is produced, overall, in one piece.

In this case, it is advantageous that the connection element can be produced particularly cost-effectively because the connection element does not have to be assembled from a plurality of parts.

Particularly in conjunction with the abovementioned refinements whereby the two end walls extend essentially only between the two tubes and the longitudinal walls do not surround the first and the second tube on the outside, it is particularly preferable if the connection element is produced from a cornered tube, in particular a square tube.

In this case, the square tube is arranged, in the overlap region, with its two open sides on those outer circumferential regions of the first and of the second tube which face one another, the margins of the open sides of the cornered tube preferably being adapted to the outer contour of those outer circumferential regions of the two tubes which face one another. Thus, a particularly cost-effective connection element is provided which can be produced simply from a cornered tube, simply by being cut to length, and which is of box-shaped design and therefore generates high flexural strength in the connection virtually in all spatial directions.

However, the connection element may also be produced from a plurality of parts which are fixedly connected to one another. In this case, the connection element is preferably produced from a first part and a second part, the first part having the first end wall and two longitudinal-wall portions, and the second part having the second end wall and two further longitudinal-wall portions, and the two parts being assembled by means of a fixed connection of the respective longitudinal-wall portions.

The longitudinal-wall portions may in this case overlap one another slightly, and the connecting seam for the connection of the respective longitudinal-wall portions to one another preferably extends transversely with respect to the longitudinal direction of the two tubes.

Configuring the connection element in two parts has the advantage that tolerances in the longitudinal direction and the transverse direction of the tubes can also be compensated via the connection of the two parts to one another.

Further advantages and features may be gathered from the following description and the accompanying drawing.

It would be appreciated that the features mentioned above and those yet to be explained below can be used not only in the combination specified in each case, but also in other combinations or alone, without departing from the scope of the present invention.

BRIEF DESCRIPTION OF THE DRAWINGS

Exemplary embodiments of the invention are illustrated in the drawing and are described in more detail with reference to this. In the drawings:

FIG. 2 shows a detail, in an enlarged illustration, of the crossbeam in FIG. 1 in a perspective view of one end of the first tube;

FIG. 3 shows a detail, in an enlarged illustration, of the crossbeam in FIG. 1 in a perspective view of one end of the second tube;

FIG. 8 shows a detail, in an enlarged illustration, of the crossbeam in FIG. 7 in a perspective view of the end of the first tube;

FIG. 9 shows a detail, in an enlarged illustration, of the crossbeam in FIG. 7 in a perspective view of the end of the second tube.

DETAILED DESCRIPTION OF PREFERRED EXEMPLARY EMBODIMENTS

Figure 1:
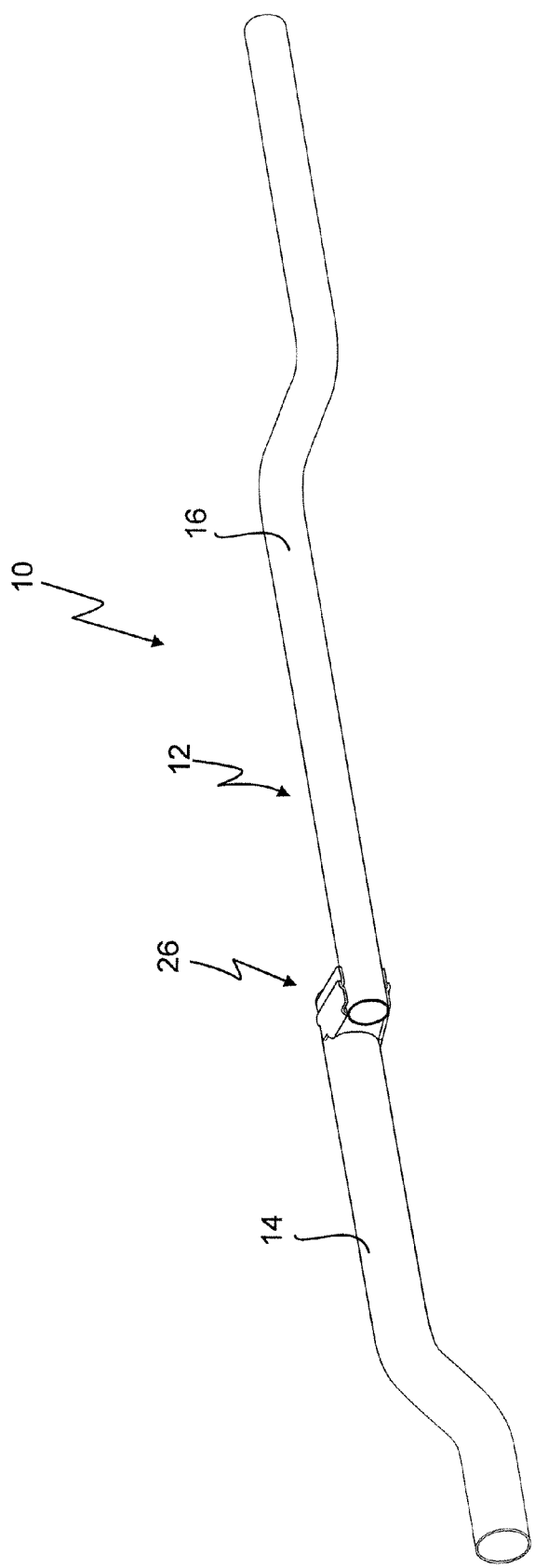
FIG. 1 shows a detail of a crossbeam comprising a tube arrangement which has a first tube and a second tube and also a connection element for connecting the two tubes, in a perspective illustration.

FIG. 1 illustrates a detail of a crossbeam given the general reference symbol 10. FIGS. 2 and 3 show particulars of the crossbeam 10. The crossbeam 10 serves as a body component of a motor vehicle and is installed in a motor vehicle between the A-pillars below the windscreen and receives the instrument panel.

The crossbeam 10 comprises a tube arrangement 12 which has a first tube 14 and a second tube 16.

In the exemplary embodiment shown, the first tube 14 and the second tube 16 are of circular cross section. It is to be understood that the first tube 14 and the second tube 16 may also have cross-sectional profiles deviating from a circular cross section. In the exemplary embodiment shown, the first tube 14 has a larger cross-sectional dimension than the second tube 16 or, in the case of the tubes 14 and 16 shown, which have a circular cross section, the first tube 14 has a larger outside diameter than the second tube 16.

The first tube 14 and the second tube 16 are arranged in relation to one another with an offset A (see FIG. 2) transversely to the longitudinal direction of the tubes 14, 16. The offset A is selected such that those outer circumferential regions 18 of the first tube 14 and 20 of the second tube 16 which face one another are not in contact with one another.

Furthermore, the first tube 14 and the second tube 16 are arranged in relation to one another with an overlap region B in the longitudinal direction of the tubes 14, 16, so that a first end 22 of the first tube 14 is arranged at a side of the second tube 16 at a distance from a second end 24 of the second tube 16.

In the overlap region B, the first tube 14 and the second tube 16 are connected to one another fixedly, in particular in a flexion-resistant manner, by means of a connection element 26.

The connection element 26 ensures, in particular, a flexion-resistant connection not only with respect to flexural forces acting in the plane which is spanned by the arrangement in which the tubes 14 and 16 lie side by side, and with respect to flexural forces acting in a plane perpendicular to the above-mentioned plane, but also with respect to flexural forces which act in spatial directions deviating from the planes mentioned above.

For this purpose, the connection element 26 is designed as a box-shaped polygonal profile which is described in more detail below.

The connection element 26 has a first end wall 28 which extends between the first end 22 of the first tube 14 and the second tube 16 transversely with respect to the longitudinal direction of the tubes 14 and 16. The end wall 28 is of plate-shaped design.

The connection element 26 has, spaced apart from the first end wall 28 in the longitudinal direction of the tubes 14, 16, a second end wall 30 which extends transversely with respect to the longitudinal direction of the tubes 14, 16 between the second end 24 of the second tube 16 and the first tube 14. In the exemplary embodiment shown, the end walls 28 and 30 run parallel to one another and in each case perpendicularly with respect to the longitudinal direction of the tubes 14, 16. Contrary to this, however, it is likewise possible that the end walls 28, 30 do not run parallel, but at an inclination with respect to one another. The end walls 28, 30 may also run obliquely with respect to the longitudinal direction of the tubes 14, 16, which is likewise also to be understood as meaning "transversely with respect to the longitudinal direction" of the tubes 14, 16.

The second end wall 30 is likewise of plate-shaped design.

The first end wall 28 and the second end wall 30 are in each case fastened both to the first tube 14 and to the second tube 16 fixedly, in particular in a materially integral manner, for example by means of welding.

The first end wall 28 has, at its end facing the first tube 14, a margin 32 which is adapted to the circumferential contour of the first tube 14 and which bears only partially circumferentially against the outer circumference of the first tube 14. Furthermore, the first end wall 28 has, at its end facing the second tube 16, a margin 34 which is adapted to the circumferential contour of the second tube 16 and which likewise bears only partially circumferentially against the outer circumference of the second tube 16. In the exemplary embodiment shown, the margins 32 and 34 of the first end wall 28 bear respectively against the first tube 14 and against the second tube 16 over a circumferential angle of less than 180°. It may, however, also be considered that the margins bear respectively against the first tube 14 and against the second tube 16 over a circumferential angle of 180° or more.

The second end wall 30 has comparably, at its end facing the second tube 16, a margin 36 adapted to the circumferential contour of the second tube and, at its end facing the first tube 14, a margin 38 adapted to the circumferential contour of the first tube 14, the margins 36, 38 bearing only partially circumferentially against the outer circumference of the second tube 16 and of the first tube 14 respectively, as already described above with regard to the first end wall 28.

Furthermore, the connection element 26 has two longitudinal walls 40 and 42 which extend in the overlap region B in the longitudinal direction of the tubes 14, 16 from the first end wall 28 to the second end wall 30 and which are connected to the end walls 28, 30 fixedly, particularly in one piece, and are connected to the tubes 14, 16 fixedly, in particular in a materially integral manner, for example by welding.

The two longitudinal walls 40 and 42 are spaced apart from one another transversely with respect to the longitudinal direction of the tubes 14, 16, the spacing between the longitudinal walls 40, 42 corresponding in the region of the first tube 14 to the outside diameter of the tube 14 in the overlap region B and in the region of the second tube 16 to the outside diameter of the second tube 16 in the overlap region B. This spacing of the longitudinal walls 40 and 42 is the preferred spacing, but may also be selected lower. Since the outside diameters of the tubes 14 and 16 are different, the side walls 40, 42 do not run parallel to one another, but are inclined with respect to one another. The two end walls 28, 30 and the two longitudinal walls 40 and 42 form, in a sectional plane which runs parallel to the longitudinal direction of the tubes 14, 16 and is located between the tubes 14, 16, essentially the shape of a square profile, thus generating a highly flexion-resistant connection between the tubes 14, 16 with respect to flexural forces which act in virtually any spatial directions.

In this exemplary embodiment, the longitudinal walls 40 and 42 extend in the direction transversely with respect to the longitudinal direction of the tubes 14, 16 only as far as outer contour points 44, 46 and 48, 50 which are located respectively on the first tube 14 and on the second tube 16 and which are spaced apart from those outer contour regions 52, 54 of the first tube 14 and of the second tube 16 which face away from one another. In the exemplary embodiment shown, the longitudinal walls 40 and 42 extend approximately to level with the diameter of the tubes 14 and 16 perpendicularly to the plane spanned by the tubes 14, 16, so that those outer wall regions 52 and 54 of the tubes 14, 16 which face away from one another remain free over a part-circumference of about 180°. The outer circumferential regions 52, 54 facing away from one another are therefore available for mounting further structural components on the crossbeam 10, without the connection element 26 interfering with such structural elements.

In the exemplary embodiment shown, the connection element 26 is of multi-part design, and specifically, in the exemplary embodiment shown, consists especially of two parts 56 and 58 which are fixedly connected to one another.

The part 56 has the end wall 28 and two longitudinal-wall portions 60 and 62 fixedly connected to this, and the second part 58 has the second end wall 30 and two longitudinal-wall portions 64 and 66, the longitudinal-wall portions 62 and 66 being arranged with an overlap with respect to one another and being fixedly connected, in particular welded, to one another at the overlap, and the longitudinal-wall portions 60 and 64 being fixedly connected to one another in the same way.

Figure 4:
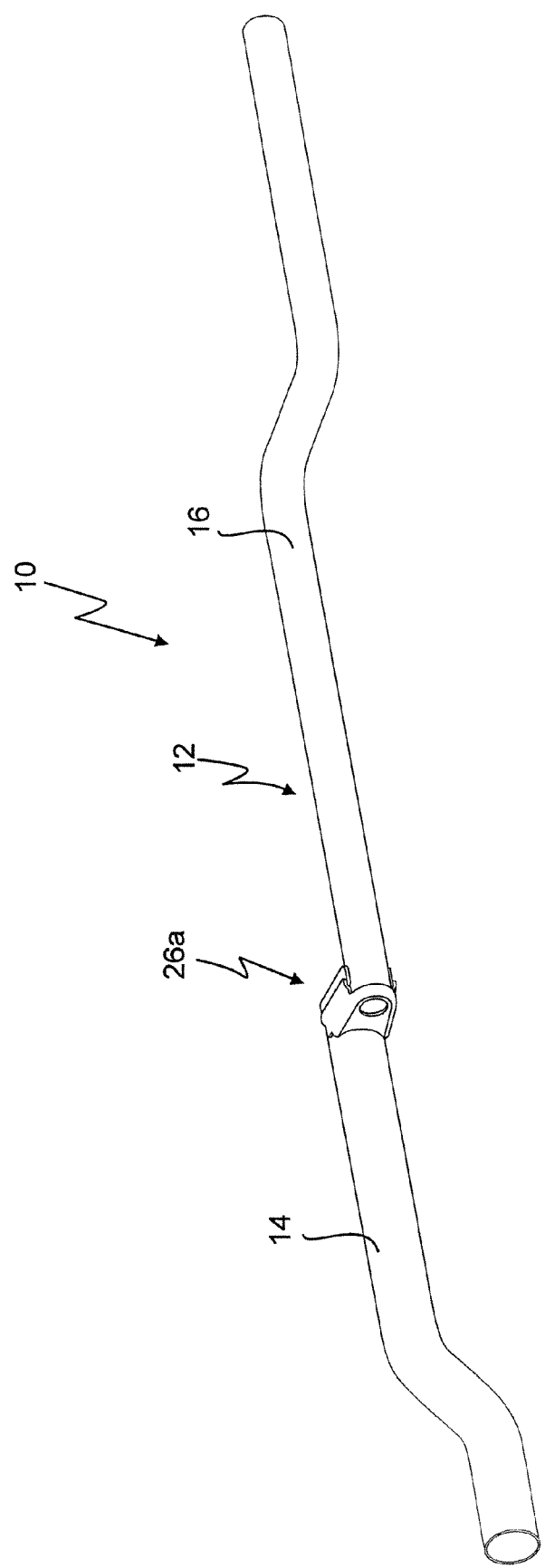
FIG. 4 shows the crossbeam in FIG. 1 in an exemplary embodiment, modified with respect to FIG. 1, of the connection element of the tube arrangement, in perspective illustration.
Figure 6:
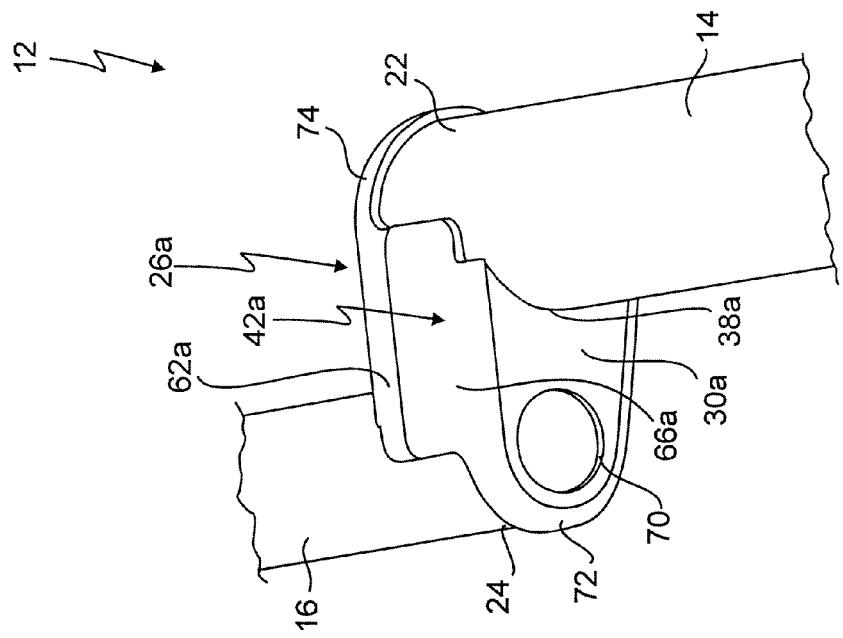
FIG. 6 shows a detail, in an enlarged illustration, of the crossbeam in FIG. 4 in a perspective view of one end of the second tube.
Figure 5:
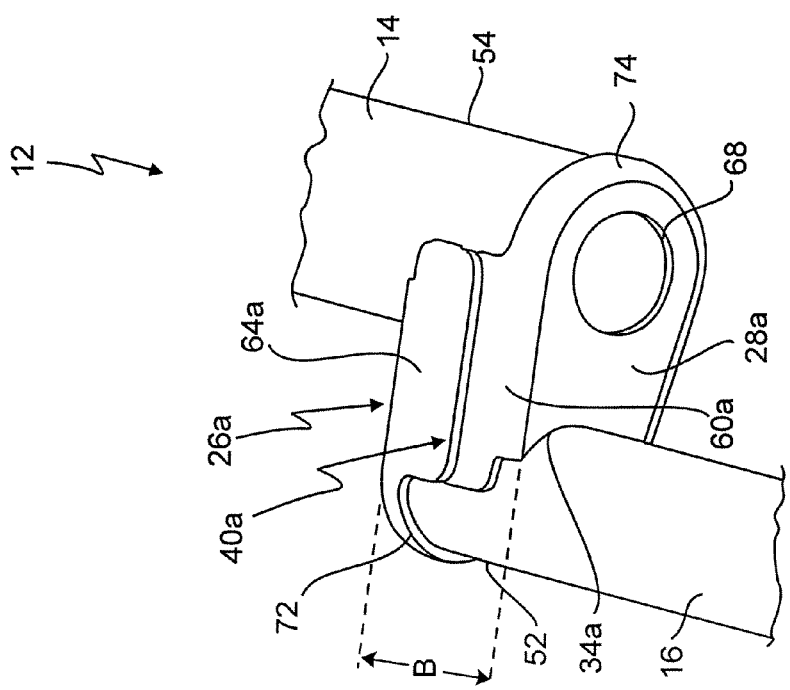
FIG. 5 shows a detail, in an enlarged illustration, of the crossbeam in FIG. 4 in a perspective view of one end of the first tube.

In FIG. 4, the tube arrangement 12 of the crossbeam 10, the said tube arrangement having the first tube 14 and the second tube 16, is illustrated with a connection element 26a which is modified as compared with FIGS. 1 to 3. FIGS. 5 and 6 show further particulars of the connection element 26a.

In FIGS. 4 to 6, those parts and elements of the connection element 26a which are comparable to parts and elements in FIGS. 1 to 3 are given the same reference symbols as in FIGS. 1 to 3, supplemented by the letter a.

Only the differences of the connection element 26a from the connection element 26 in FIGS. 1 to 3 are described below.

In contrast to the end wall 28, the first end wall 28a bears against the end face of the first end 22 of the first tube 14 in the manner of a lid. For weight saving, an orifice 68 is formed in the end wall 28a. The first end wall 28a has, at its end facing the second tube 16, the margin 34a which is designed in the same way as the margin 34 in FIG. 2.

The second end wall 30a bears against the end face of the second end 24 of the second tube 16. The end wall 30a, too, has an orifice 70 for weight reduction.

The longitudinal walls 40a and 42a surround those outer circumferential regions 52 and 54 of the tubes 14 and 16 which face away from one another, directly adjacently to the first end wall 28a and to the second end wall 30a, over a short part-length of the overlap region B, that is to say the longitudinal walls 40a and 42a have, as seen in the longitudinal direction of the tubes 14, 16, narrow looping portions 72 and 74 which surround or loop around, over about 180°, those outer circumferential regions 52, 54 of the tubes 14, 16 which face away from one another.

The connection element 26a is otherwise identical to the connection element 26.

Figure 7:
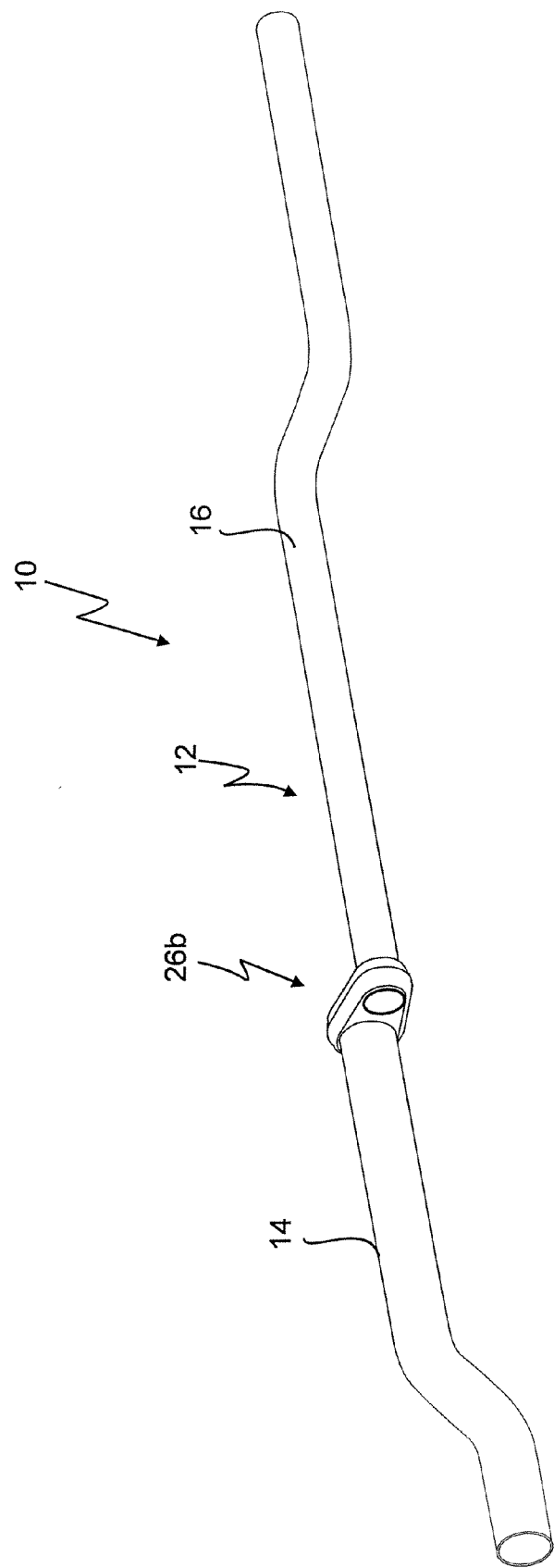
FIG. 7 shows the crossbeam in FIG. 1 with a further exemplary embodiment of the connection element of the tube arrangement, in a perspective illustration.

In FIG. 7, the tube arrangement 12 of the crossbeam 10, the said tube arrangement having the first tube 14 and the second tube 16, is illustrated with a connection element 26b modified as compared with the connection element 26. Further particulars of the connection element 26b are illustrated in FIGS. 8 and 9.

Parts or elements of the connection element 26b which are identical or comparable to parts or elements of the connection element 26 are given the same reference symbol as in the connection element 26, supplemented by the letter b.

The first end wall 28b of the connection element 26b has a fully circumferentially closed orifice 76, in which the first end 22 of the first tube 14 engages, in the exemplary embodiment shown the first end 22 engaging slightly through the orifice 76. The margin of the orifice 76 in the end wall 28b is adapted to the outer circumference of the first tube 14 in the region of the first end 22 of the latter. Furthermore, the first end wall 28b has a further fully circumferentially closed orifice 78 through which the second tube 16 engages.

The second end wall 30b has correspondingly a fully circumferentially closed orifice 80, into which the second end 24 of the second tube 16 engages or through which the said second end engages slightly. The second end wall 30b has a further fully circumferentially closed orifice 82, through which the first tube 14 engages.

The longitudinal walls 40b and 42b of the connection element 26b completely surround the outer circumferential regions 52 and 54 facing away from one another, over the entire spacing between the first end wall 28b and the second end wall 30b, as seen in the longitudinal direction. Thus, as seen in the circumferential direction around the two tubes 14 and 16, the connection element 26b is an essentially completely closed box profile which in cross section, in a plane parallel to the longitudinal direction which is located between the tubes 14, 16, constitutes approximately a square profile. In this refinement, the connection element 26b has to be fixedly connected, for example welded, to the tubes 14, 16 solely via the end walls 28b and 30b, specifically along the margins of the orifices 76 to 82. The longitudinal walls 40, 42 are fixedly connected only to the end walls 28b, 30b and therefore contribute to the high flexural strength of the connection, without also having to be welded to the tubes 14, 16.

This refinement of the connection element 26b generates a very highly flexion-resistant connection between the tubes 14 and 16, so that the selected length of the overlap region B may, if appropriate, be lower than in the exemplary embodiments described above.

As in the exemplary embodiments described above, the connection element 26b is constructed from two parts which are fixedly connected to one another, with or without overlap, along a connecting seam 84 which extends in the circumferential direction around the longitudinal direction of the tubes 14, 16.

Figure 10:
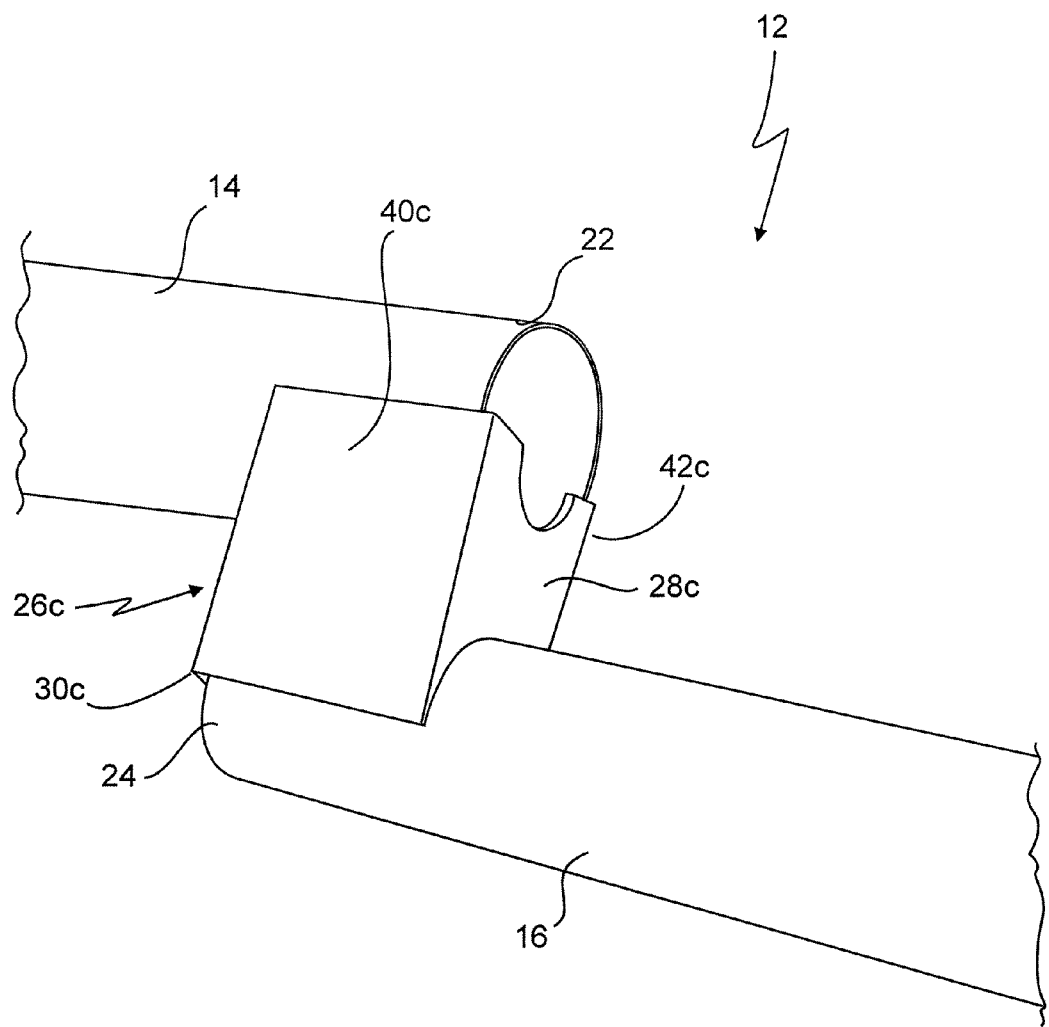
FIG. 10 shows the crossbeam in FIG. 1 with a further exemplary embodiment of the connection element of the tube arrangement, in a perspective view of the end of the first tube.

FIG. 10 shows the tube arrangement 12 of the crossbeam 10, the said tube arrangement having the first tube 14 and the second tube 16, with a further example of a connection element 26c which, in contrast to the exemplary embodiments described above, is produced in one piece in a simple way.

Parts or elements of the connection element 26c which are identical or comparable to parts or elements of the connection element 26 in FIGS. 1 to 3 are given the same reference symbols, supplemented by the letter c.

The connection element 26c is produced in one piece from a cornered tube, here a square tube.

The square tube is, if appropriate, first cut to a length which corresponds approximately to the offset A of the tubes 14, 16, as illustrated in FIG. 2.

Two opposite sides of the square tube thus cut to length form the longitudinal walls 40c and 42c of the connection element 26c. The other two walls of the square tube form the first end wall 28c and the second end wall 30c of the connection element 26c.

The end walls 28c and 30c bear on the end face against the ends of the tubes 14 and 16 in a similar way to the connection element 26a, part-circular recesses also being provided in the end walls in order to save material and reduce weight.

However, recesses adapted to the outer contour of the first tube 14 and of the second tube 16 may also be introduced into the walls of the square tube which form the end walls 28c and 30c, in a similar way to what was described with regard to FIGS. 2 and 3. The margins of these recesses, which correspond to the margins 32, 34, 36, 38 in FIGS. 2 and 3, may in this case be of semicircular design and correspondingly bear over a circumferential angle of about 180° against those outer circumferential regions 18 and 20 of the tubes 14 and 16 which face one another.

The connection element 26c can be produced very simply in this way, and also it is very simple to make the connection between the first tube 14 and the second tube 16 in the overlap region B by means of the connection element 26c.

It would be appreciated that those design features of the connection elements 26 to 26c which were described in conjunction with FIGS. 1 to 10 may be combined in any desired way with one another. Thus, in one variant, for example in the case of the connection element in FIG. 2, the first end wall 28 and the second end wall 30 may be left unchanged, and the longitudinal walls 40 and 42 may be modified such that they completely surround those outer circumferential regions 52 and 54 of the tubes 14 and 16 which face away from one another, as is the case in the connection element 26c in FIGS. 8 and 9.

What is claimed is:

1. A tube arrangement, comprising:

a first tube and a second tube, said first tube and said second tube being arranged in relation to one another with an offset transversely with respect to a longitudinal direction of said first and second tubes and with a partial overlap region in said longitudinal direction of said first and second tubes, so that a first end of said first tube is arranged at a side of said second tube and a second end of said second tube is arranged at a side of said first tube; and at least one connection element fixedly connecting said first tube and said second tube to one another in said overlap region, said at least one connection element having a first end wall and a second end wall spaced apart from said first end wall in said longitudinal direction of said first and second tubes, which first and second end walls extend, in said overlap region, between said first and second tubes transversely with respect to said longitudinal direction of said first and second tubes, wherein said first end wall is fixedly connected to said first tube and to said second tube, and wherein said second end wall is fixedly connected to said first tube and to said second tube, wherein said first end wall bears against an end face of said first end of the first tube, and a first longitudinal wall and a second longitudinal wall spaced apart from said first longitudinal wall transversely with respect to said longitudinal direction of said first and second tubes, and which extend in said longitudinal direction of said first and second tubes from said first end wall to said second end wall, wherein said first longitudinal wall is fixedly connected to said first end wall and to said second end wall, and wherein said second longitudinal wall is fixedly connected to said first end wall and to said second end wall.

2. The tube arrangement of claim 1, wherein said first end wall has, at an end of said first end wall facing said second tube, a margin which bears only partially circumferentially against an outer circumference of said second tube.

3. The tube arrangement of claim 2, wherein said margin is adapted to a circumferential contour of said second tube.

4. The tube arrangement of claim 1, wherein said second end wall bears against an end face of said second end of said second tube.

5. The tube arrangement of claim 1, wherein said second end wall has, at an end of said second end wall facing said second tube, a margin which bears only partially circumferentially against an outer circumference of said second tube.

6. The tube arrangement of claim 5, wherein said margin is adapted to a circumferential contour of said second tube.

7. The tube arrangement of claim 1, wherein said second end wall has, at an end of said second end wall facing said first tube, a margin which bears only partially circumferentially against an outer circumference of said first tube.

8. The tube arrangement of claim 7, wherein said margin is adapted to a circumferential contour of said first tube.

9. The tube arrangement of claim 1, wherein said first and second longitudinal walls surround, at least over a part-length of a spacing between said first and said second end wall, those outer circumferential regions of said first and second tubes which face away from one another.

10. The tube arrangement of claim 1, wherein said first and second longitudinal walls extend in direction transversely to said longitudinal direction only as far as respective outer contour points which are located on said first and second tubes and which are spaced apart from those outer contour regions of said first and second tubes which face away from one another.

11. The tube arrangement of claim 1, wherein said at least one connection element is produced, over all, in one piece.

12. The tube arrangement of claim 1, wherein said at least one connection element is produced from a cornered tube.

13. The tube arrangement of claim 1, wherein said at least one connection element is produced from a plurality of parts which are fixedly connected to one another.

14. The tube arrangement of claim 13, wherein said at least one connection element is produced from a first part and a second part, said first part having said first end wall and two longitudinal-wall portions, said second part having said second end wall and two further longitudinal-wall portions, and said first and second parts being assembled by means of a fixed connection of said respective longitudinal-wall portions.

15. The tube arrangement of claim 1, wherein the tube arrangement forms at least part of a cross beam for a motor vehicle.

16. A tube arrangement, comprising:

a first tube and a second tube, said first tube and said second tube being arranged in relation to one another with an offset transversely with respect to a longitudinal direction of said first and second tubes and with a partial overlap region in said longitudinal direction of said first and second tubes, so that a first end of said first tube is arranged at a side of said second tube and a second end of said second tube is arranged at a side of said first tube; and at least one connection element fixedly connecting said first tube and said second tube to one another in said overlap region, said at least one connection element having a first end wall and a second end wall spaced apart from said first end wall in said longitudinal direction of said first and second tubes, which first and second end walls extend, in said overlap region, between said first and second tubes transversely with respect to said longitudinal direction of said first and second tubes, wherein said first end wall is fixedly connected to said first tube and to said second tube, and wherein said second end wall is fixedly connected to said first tube and to said second tube, wherein said first end wall has a fully circumferentially closed orifice, into which or through which said first end of said first tube engages, and a first longitudinal wall and a second longitudinal wall spaced apart from said first longitudinal wall transversely with respect to said longitudinal direction of said first and second tubes, and which extend in said longitudinal direction of said first and second tubes from said first end wall to said second end wall, wherein said first longitudinal wall is fixedly connected to said first end wall and to said second end wall, and wherein said second longitudinal wall is fixedly connected to said first end wall and to said second end wall.

17. The tube arrangement of claim 16, wherein said first end wall has a fully circumferentially closed orifice, through which said second tube engages.

18. The tube arrangement of claim 16, wherein said second end wall has a fully circumferentially closed orifice, into which or through which a second end of said second tube engages.

19. The tube arrangement of claim 16, wherein said second end wall has a fully circumferentially closed orifice, through which said first tube engages.

20. The tube arrangement of claim 16, wherein said first and second longitudinal walls surround, at least over a part-length of a spacing between said first and said second end wall, those outer circumferential regions of said first and second tubes which face away from one another.

21. The tube arrangement of claim 16, wherein said at least one connection element is produced, over all, in one piece.

22. The tube arrangement of claim 16, wherein said at least one connection element is produced from a plurality of parts which are fixedly connected to one another.

23. The tube arrangement of claim 22, wherein said at least one connection element is produced from a first part and a second part, said first part having said first end wall and two longitudinal-wall portions, said second part having said second end wall and two further longitudinal-wall portions, and said first and second parts being assembled by means of a fixed connection of said respective longitudinal-wall portions.

24. The tube arrangement of claim 16, wherein the tube arrangement forms at least part of a cross beam for a motor vehicle.

25. A tube arrangement, comprising:
   a first tube and a second tube, said first tube and said second tube being arranged in relation to one another with an offset transversely with respect to a longitudinal direction of said first and second tubes and with a partial overlap region in said longitudinal direction of said first and second tubes, so that a first end of said first tube is arranged at a side of said second tube and a second end of said second tube is arranged at a side of said first tube; and
   at least one connection element fixedly connecting said first tube and said second tube to one another in said overlap region, said at least one connection element having
      a first end wall and a second end wall spaced apart from said first end wall in said longitudinal direction of said first and second tubes, which first and second end walls extend, in said overlap region, between said first and second tubes transversely with respect to said longitudinal direction of said first and second tubes, wherein said first end wall is fixedly connected to said first tube and to said second tube, and wherein said second end wall is fixedly connected to said first tube and to said second tube, wherein said first end wall has, at an end of said first end wall facing said first tube, a margin, which bears only partially circumferentially against an outer circumference of said first tube, and
      a first longitudinal wall and a second longitudinal wall spaced apart from said first longitudinal wall transversely with respect to said longitudinal direction of said first and second tubes, and which extend in said longitudinal direction of said first and second tubes from said first end wall to said second end wall, wherein said first longitudinal wall is fixedly connected to said first end wall and to said second end wall, and wherein said second longitudinal wall is fixedly connected to said first end wall and to said second end wall.

26. The tube arrangement of claim 25, wherein said margin is adapted to a circumferential contour of said first tube.

27. The tube arrangement of claim 25, wherein said first end wall has, at an end of said first end wall facing said second tube, a margin which bears only partially circumferentially against an outer circumference of said second tube.

28. The tube arrangement of claim 27, wherein said margin is adapted to a circumferential contour of said second tube.

29. The tube arrangement of claim 25, wherein said second end wall has, at an end of said second end wall facing said second tube, a margin which bears only partially circumferentially against an outer circumference of said second tube.

30. The tube arrangement of claim 29, wherein said margin is adapted to a circumferential contour of said second tube.

31. The tube arrangement of claim 25, wherein said second end wall has, at an end of said second end wall facing said first tube, a margin which bears only partially circumferentially against an outer circumference of said first tube.

32. The tube arrangement of claim 31, wherein said margin is adapted to a circumferential contour of said first tube.

33. The tube arrangement of claim 25, wherein said first and second longitudinal walls extend in direction transversely to said longitudinal direction only as far as respective outer contour points which are located on said first and second tubes and which are spaced apart from those outer contour regions of said first and second tubes which face away from one another.

34. The tube arrangement of claim 25, wherein said at least one connection element is produced, over all, in one piece.

35. The tube arrangement of claim 25, wherein said at least one connection element is produced from a cornered tube.

36. The tube arrangement of claim 25, wherein said at least one connection element is produced from a plurality of parts which are fixedly connected to one another.

37. The tube arrangement of claim 25, wherein said at least one connection element is produced from a first part and a second part, said first part having said first end wall and two longitudinal-wall portions, said second part having said second end wall and two further longitudinal-wall portions, and said first and second parts being assembled by means of a fixed connection of said respective longitudinal-wall portions.

38. The tube arrangement of claim 25, wherein the tube arrangement forms at least part of a cross beam for a motor vehicle.

* * * * *

UNITED STATES PATENT AND TRADEMARK OFFICE
CERTIFICATE OF CORRECTION

PATENT NO. : 8,439,591 B2  
APPLICATION NO. : 12/548196  
DATED : May 14, 2013  
INVENTOR(S) : Schmieder et al.

Page 1 of 1

It is certified that error appears in the above-identified patent and that said Letters Patent is hereby corrected as shown below:

On the Title Page, Item (74), under "Attorney, Agent, or Firm", in Column 2, Line 1, delete "Borin" and insert -- Borun --, therefor.

In the Claims

In Column 11, Line 24, in Claim 1, delete "end" and insert -- second end --, therefor.

In Column 14, Line 44, in Claim 37, delete "claim 25," and insert -- claim 36, --, therefor.

Signed and Sealed this
Tenth Day of February, 2015

Michelle K. Lee
*Deputy Director of the United States Patent and Trademark Office*